(12) United States Patent
Otto et al.

(10) Patent No.: US 6,622,836 B2
(45) Date of Patent: Sep. 23, 2003

(54) RELEASE SYSTEM FOR A CLUTCH ASSEMBLY

(75) Inventors: Thomas Otto, Würzburg (DE); Herbert Voit, Schweinfurt (DE); Manfred Wehner, Euerbach (DE); Frank Hirschmann, Niederwerrn (DE)

(73) Assignee: Mannesmann Sachs AG, Schweinfurt (DE)

( * ) Notice: Subject to any disclaimer, the term of this patent is extended or adjusted under 35 U.S.C. 154(b) by 41 days.

(21) Appl. No.: 09/998,577

(22) Filed: Nov. 16, 2001

(65) Prior Publication Data

US 2002/0060116 A1 May 23, 2002

(30) Foreign Application Priority Data

Nov. 21, 2000 (DE) .......................................... 100 57 610

(51) Int. Cl.[7] .............................................. F16D 25/06
(52) U.S. Cl. .............. 192/18 A; 192/12 C; 192/85 CA; 192/89.24; 192/98
(58) Field of Search ........................ 192/18 A, 91 A, 192/13 R, 12 C, 85 CA, 89.24, 98, 99 S

(56) References Cited

U.S. PATENT DOCUMENTS

| | | | | |
|---|---|---|---|---|
| 3,912,058 A | * | 10/1975 | Parkins ..................... 192/18 A |
| 4,099,604 A | | 7/1978 | Higgerson ................... 192/111 |
| 4,109,773 A | * | 8/1978 | Higgerson et al. ........ 192/111 A |
| 4,142,619 A | * | 3/1979 | Spokas ................... 192/113.35 |
| 4,579,203 A | * | 4/1986 | Link ............................ 192/15 |
| 4,848,531 A | * | 7/1989 | Gray et al. ............... 192/13 R |
| 5,443,143 A | * | 8/1995 | Tobiasz ................. 192/85 CA |

* cited by examiner

Primary Examiner—Saul Rodriquez
(74) Attorney, Agent, or Firm—Cohen, Pontani, Lieberman & Pavane

(57) ABSTRACT

A release system for a clutch assembly comprises a release slide, which is or can be connected to a stored-energy element of the clutch assembly to execute release movements, and at least one brake element, which can move along with the release slide during the execution of release movements. This brake element can be brought into braking interaction with an opposing brake element which is or can be connected in an essentially nonrotatable manner to a clutch output shaft, where the release slide and the minimum of one brake element form a piston/cylinder unit with at least one fluid chamber. Pressure fluid is introduced into the minimum of one fluid chamber to produce a force which preloads or moves the minimum of one brake element relative to the release slide.

10 Claims, 2 Drawing Sheets

RELEASE SYSTEM FOR A CLUTCH ASSEMBLY

BACKGROUND OF THE INVENTION

1. Field of the Invention

The present invention pertains to a release system for a clutch assembly, comprising a release slide, which is or can be connected to a stored-energy element of the clutch assembly to execute release movements, and at least one brake element, which is free to move along with the release slide during the execution of the release movements, which brake element can be brought into braking interaction with an opposing brake element which is or can be connected in essentially nonrotatable fashion to a clutch output shaft, where the release slide and the minimum of one brake element form a piston/cylinder unit with at least one fluid chamber.

2. Description of the Related Art

A release system is known from U.S. Pat. No. 4,099,604, in which a brake element is movably connected to a release slide, which can slide in the same direction as that in which a clutch rotational axis extends to execute release movements. If, after the release movement has been executed and the clutch has been completely released, the release slide is moved even farther by appropriate actuation, the brake element is pressed against an opposing brake element, which is connected nonrotatably to a clutch output shaft. As a result, a braking force is exerted on the clutch output shaft and thus on the transmission input shaft. This is advantageous especially when such systems are used in conjunction with unsynchronized transmissions. In order to ensure in an arrangement of this type that, even after the friction linings of the clutch assembly have become worn, the release system and also the brake system provided for the clutch output shaft will still have the same actuating characteristic or working characteristic, a wear compensating mechanism is provided, by means of which a relative displacement occurs between the release slide and the pressure plate upon the occurrence of wear without any change in the original installation position of the stored-energy element. This ensures that the release slide and thus also the braking element will always remain in approximately the same installation position regardless of the amount of wear and that the working characteristics of the braking arrangement for the clutch output shaft will always remain the same during the execution of clutch-release operations.

A release system for a clutch assembly is also known from U.S. Pat. No. 3,912,058, in which a release slide, which can be displaced by the introduction of pressure fluid so that it can execute release movements, can also be used to push a brake element to generate a braking force at least in the situation where the release stroke exceeds a certain value. To take into account the fact here, too, that, as wear occurs, the installation position of the stored-energy element and thus also the base of the release slide can change, the brake element or a part thereof and the release slide form a piston/cylinder unit. This unit has a cylindrical chamber, into which fluid is introduced to an extent corresponding to the amount of wear and thus corresponding to the axial displacement of the release slide. The relative displacement between the release slide and the section of the braking element working together with the slide to form the piston/cylinder unit, which relative displacement occurs as a result of wear, is ultimately compensated by the increase in the volume of the fluid chamber and the filling of this fluid chamber with fluid. In spite of the displacement of the release slide occurring as a result of wear, therefore, the section of the brake element cooperating with it to form the piston/cylinder unit is held in the same axial installation position, so that, for all succeeding clutch-release operations, a uniform working characteristic can be obtained, at least in the area of the system which provides braking force for the clutch output shaft or transmission input shaft.

SUMMARY OF THE INVENTION

It is the object of the present invention to provide a release system for a clutch assembly by means of which it is possible to produce a precise amount of braking force for a clutch output shaft or a transmission input shaft.

According to the invention, pressure fluid can be introduced into the minimum of one fluid chamber to produce a force which preloads or moves the minimum of one brake element relative to the release slide.

In contrast to the state of the art, in which the thrust produced by the release slide is transmitted to the brake element by way of the fluid in the fluid chamber to displace the brake element so that it will produce the braking action, the force which is intended to decelerate the transmission input shaft is generated actively in the release system by introducing pressure fluid into the minimum of one fluid chamber. The braking force can thus be generated in almost complete independence of the executed release movement or of the executed release stroke of the release slide, so that a much more precise actuation of the system serving to decelerate the transmission input shaft can be achieved in comparison to an arrangement in which the desired effect is necessarily coupled with the stroke of the release slide. It is possible in particular to achieve a temporary disconnection between the braking operation and the release operation, so that, for example, it is possible to begin building up the braking force even before the clutch has reached the position in which it is completely released, and ultimately there is no phase present in which the transmission input shaft can rotate without being braked.

It is possible, for example, for the pressure fluid which can be introduced into the minimum of one fluid chamber to generate a braking pressure, which presses the minimum of one brake element against the counter-brake element.

So that it is possible to produce a braking characteristic which is uniformly distributed around the circumference, it is proposed that a plurality of cylindrical chambers be provided in the release slide, arranged in sequence in the circumferential direction relative to a rotational axis, and that an associated piston segment of the minimum of one brake element fits into each of these chambers with the freedom to slide. The same result can also be achieved in a different way by providing the release slide with a cylindrical chamber in the shape of a ring surrounding the rotational axis, into which chamber a ring-shaped piston segment of the minimum of one brake element fits with the freedom to slide.

Because the brake element usually remains in approximately the same axial position during the execution of engagement and release operations or at most is not pushed as far in the axial direction as the release slide is, it is proposed that, to simplify the introduction of the pressure fluid into the minimum of one fluid chamber, a pressure fluid feed connection arrangement for the minimum of one fluid chamber be provided on the minimum of one brake element.

In the release system according to the invention, it is preferable to provide a pressure fluid feed arrangement by means of which pressure fluid can be introduced into the minimum of one fluid chamber essentially only when the clutch assembly has been actuated beyond the point associated with the essentially complete release of the clutch.

To avoid undesirable interactions in the area of the brake system during the execution of clutching operations, it is proposed that, upon actuation of the clutch assembly up to the position in which release is essentially complete, essentially no fluid pressure which could produce a displacing force is allowed to build up in the fluid chamber. Nevertheless, it should also be pointed out again that, as a result of the disconnection between the release system and the brake system, it is possible for there to be a certain overlap between the execution of a release operation and the execution of a braking operation, which overlap can be advantageous and desirable under certain conditions.

The present invention also pertains to a drive system with a clutch assembly and a release system according to the invention, where it is also provided that pressure fluid is introduced into the minimum of one fluid chamber only after the clutch assembly has been actuated beyond the point at which release is essentially complete.

It is also advantageous in this release system for there not to be any buildup in the fluid pressure which could produce a displacing force in the minimum of one fluid chamber during the times that the clutch assembly is not being actuated to execute a release movement or during the times that it is being actuated but has not yet reached or has not yet exceeded the essentially complete release actuation position. It is also preferred that the minimum of one fluid chamber be connected to a fluid reservoir or to the outside.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
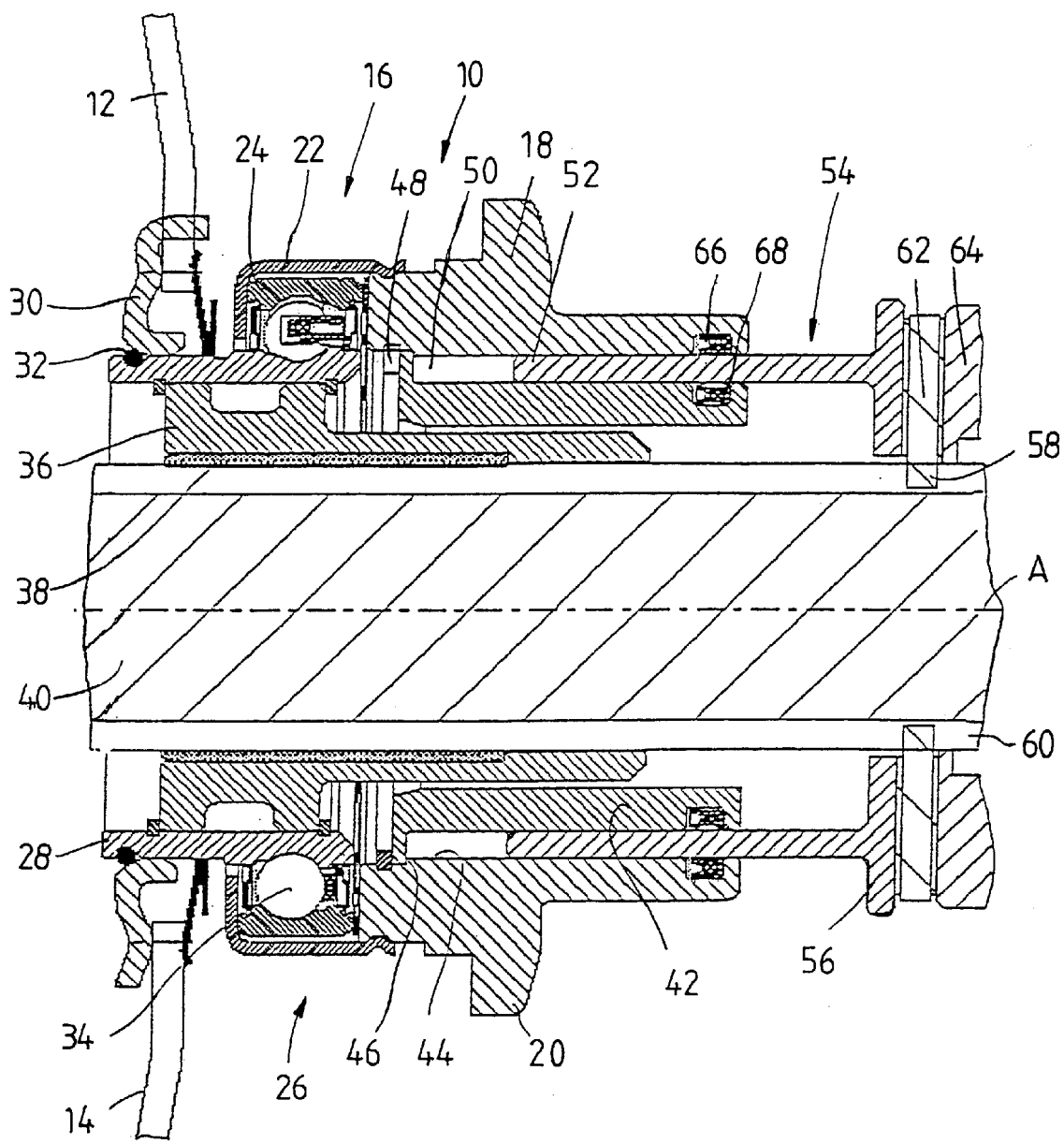
FIG. 1 is a longitudinal section of a release system according to the invention.
Figure 2:
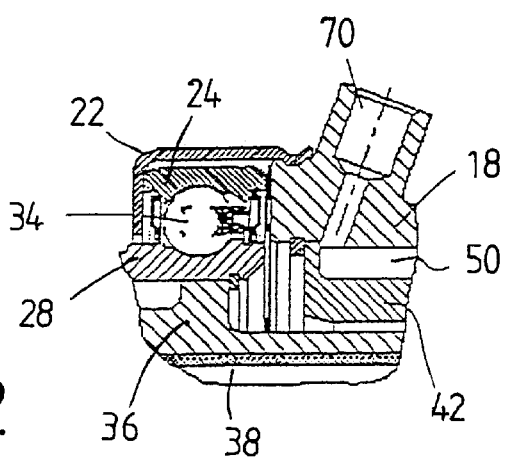
FIG. 2 is a detailed view of the release system of FIG. 1.

FIGS. 1 and 2 show a first embodiment of a release system 10 according to the invention. This release system is used in general to shift the radially inner area 12 of a stored-energy element 14 of a motor vehicle friction clutch to execute release operations. In the case shown, this friction clutch is a clutch of the pull type; that is, the radially inner part 12 of the stored-energy element 14 is pulled away from the drive assembly or pressure plate of the friction clutch and thus moved toward the right in the diagram of FIG. 1, in the direction in which the rotational axis A extends.

The release system 10 includes a release slide 16 which includes release ring 18 having a radially outward projecting flange-like area 20 against which a release fork or the like can act to shift the release slide 16 to execute the release operation. An outer bearing ring 24 of a release bearing 26 tightly connected to the release ring 18 by way of a retaining clamp element 22. An inner bearing ring 28 is tightly connected to a driver element 30 by means of a latching ring 32 for joint movement in the release direction. Rolling elements such as bearing balls 34 act between the two bearing rings 24, 28. The inner bearing ring 28 is supported rotatably on its radially inside surface by a support sleeve 36 and a plain bearing element 38 on a clutch output shaft or transmission input shaft 40 and thus forms the support or base of the entire release system 16.

An inner release ring 42 is provided inside the release ring 18 and concentric to it relative to the rotational axis A. The inner release ring 42 is held in place axially with respect to the release ring 18 by a stop shoulder 46 formed on an inside circumferential surface 44 of the release ring 18 and by a locking ring 48. The two rings thus cooperate to form a annular cylindrical chamber 50 surrounding the rotational axis A. A cylindrical section 52 of a brake element 54 fits into in this cylindrical chamber 50, which is open axially on the side facing away from the friction clutch. A brake disk 62, which is connected nonrotatably to the shaft 40 by sets of teeth 58, 60, can be pressed against the support section 64 of a transmission housing or the like by a brake ring section 56 of the brake element 54, which brake ring section is designed as, for example, an integral part of the cylindrical section 52. The cylindrical section 52 of the brake element 54, which ultimately forms a ring-shaped piston, is inserted into the cylindrical chamber 50 in the release slide 16 in an essentially fluid-tight manner thanks to the intermediate installation of sealing elements 66, 68. A fluid feed opening 70, which can be seen in FIG. 2, is provided at a certain point on the circumference of the release ring 18. A compressed air feed line, for example, which supplies compressed air to the cylindrical chamber 50, can be fitted into this opening.

To execute a release operation, as already described above, the release slide 16 is pulled to the right in FIG. 1, that is, in the direction toward the transmission assembly, by an appropriate mechanism. When a release operation of this type is executed, it is possible, for example, for the cylindrical chamber 50 to be connected by a multi-way valve assembly to a fluid reservoir or to the outside, so that ultimately no excess fluid pressure is built up in the cylindrical chamber 50. Essentially no braking action will therefore be produced even if the brake element 54 is already resting against the brake disk 62 during the release operation, because the brake element 54 can still shift position relative to the release slide 16, since there are no forces acting on it. Once the fully released position of the friction clutch has been reached, the cylinder chamber 50 can be connected to a source of pressure fluid, such as a compressed air pump, by the appropriate switching of the multi-way valve, so that now a fluid pressure is built up in the cylinder chamber 50, and the brake element 54 can be pressed against the brake disk 62. Because both the release ring 18 and the brake element 54 are prevented from rotating by appropriate antirotation devices, which work together with stationary assemblies, a braking force is now produced in the released state by the displacement of the brake element 54, i.e., by the production of a pressure by which the brake element is pressed against the brake disk 62, which braking force leads to the braking and deceleration of the transmission input shaft 40. This is advantageous especially in the case of unsynchronized transmissions and in the execution of downshifting operations.

It can be seen from the preceding description that, as a result of the design of the release system 10 according to the invention, it is possible to make the release operation and the production of a braking force essentially independent of each other. This independence exists both in the area of the motion-coupling and also in the chronological sense, so that basically a braking force can be produced even before the clutch has arrived in its completely released position. The force required to produce the braking action, furthermore, can also be adjusted independently of the actuating force acting on the release slide 16, so that the transmission input shaft can be braked more precisely and the extent of the braking adjusted to the desired degree. When the clutch is to be reengaged, the cylinder chamber 50 is connected again to the fluid reservoir or to the outside, for example, and the release slide 16 is moved back toward the clutch. The pressure can also obviously be released from the cylinder chamber 15 at a later time, or this step can even be omitted entirely, so that, during a subsequent release operation, basically the same relative position between the release slide 16 and the brake element 54 is present. At the time of the next release operation, therefore, it would be necessary to compensate only for the wear which has occurred in the area of the clutch, possibly by supplying additional pressure fluid to the chamber.

The switching of the previously mentioned multi-way valve to supply pressure fluid to the cylinder chamber 50 can be linked, for example, with the actuation position of the clutch pedal. When the pedal is pressed down all the way, which means that the clutch has been completely released, the valve can be switched in such a way that pressure fluid flows into the cylinder chamber 50 to produce the desired braking force.

Figure 3:
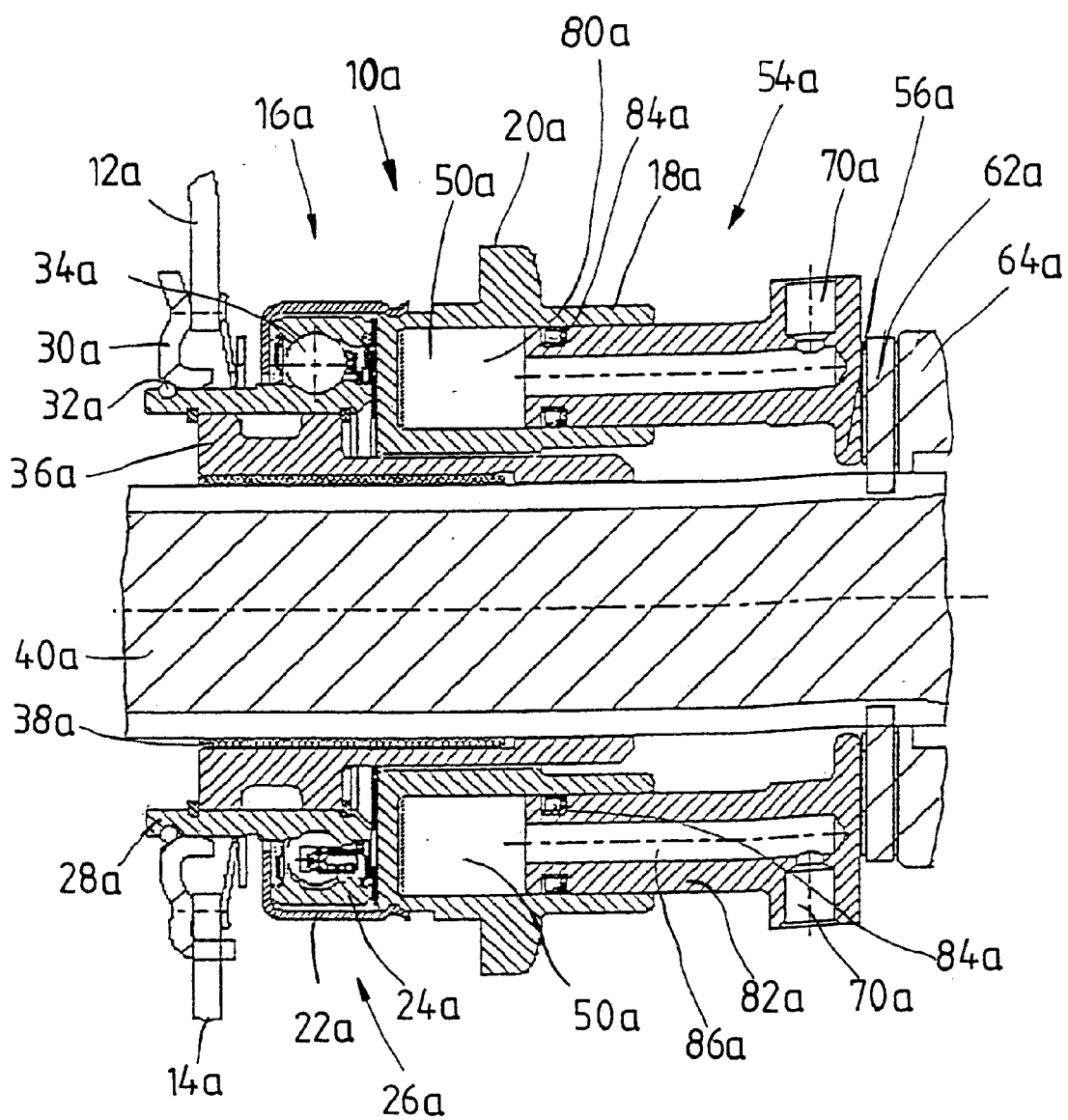
FIG. 3 is a longitudinal section of an alternative design of the release system according to the invention.

A modified design of the release system according to the invention is shown in FIG. 3. The components which are the same as those described above with respect to their design or function are provided with the same reference numbers, to which an "a" has been added. In the following, only the differences in design with respect to the previously described embodiment will be discussed.

In the design shown in FIG. 3, the release ring 18a is equipped with a plurality of openings or holes 80a, which are open at the axial end facing the transmission and arranged in a row around the circumference; these openings or holes ultimately form the cylindrical chambers 50a. Piston sections 82a of the brake element 54a are inserted into these cylindrical chambers 50a, sealing rings 84a being provided to form a fluid-tight seal. These piston sections 82a are formed as integral parts of the brake ring section 56a. An opening or hole 86a, which is open toward the cylinder chamber 50a and which is also connected to an associated fluid feed opening 70a, extends through each of the piston sections 82a. Each of the fluid feed openings 70a in this design is thus connected to an associated pressure fluid feed line, so that the pressure fluid can be introduced into the individual cylindrical chambers 50a via the openings 70a and the holes or openings 86a. The system functions in essentially the same way as that described above. There is a design advantage, however, in the sense that the brake element 54a, which does not necessarily have to move together with the release slide 16a during the execution of engagement and release operations (and which in particular will neither execute such movement nor be forced to execute such movement when the fluid pressure is being built up merely to generate a braking force), is connected to the pressure fluid feed lines, so that here essentially a rigid connection can be provided without the need for appropriately elastic sections of fluid line. The provision of several cylindrical chambers and piston sections in sequence around the circumference prevents the brake element 54a from rotating relative to the release slide 16a, so that, for complete protection against unwanted rotation, it is necessary merely to secure the release ring 18a against rotation in a manner known in and of itself, such as by means of a locking pin or bolt, which is connected to the release ring 18a and which fits into a corresponding locking recess in a stationary assembly such as the transmission, for example, or a transmission shroud.

The present invention provides a release system of simple design, which makes it possible to produce the braking force required to brake a transmission input shaft independently of the clutch-release operation. To produce this braking force, it is necessary merely to establish a connection to a hydraulic or compressed air system, normally present in many motor vehicles, especially in trucks.

It should be pointed out that various system areas of the two design variants can be combined with each other. It is also possible, of course, to provide the design according to FIG. 1 with the pressure fluid feed system via the brake element illustrated in FIG. 3. In the design variant according to FIG. 1, furthermore, the assembly consisting of the release ring 18 and the inner ring 42 could also be made as a single part.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A release system for a clutch assembly having a stored energy element, said system comprising
   a release slide which is connectable to the stored energy element to execute release movements, said release slide having a rotational axis,
   at least one brake element which, with said release slide, forms a piston cylinder unit having at least one fluid chamber between said release slide and said brake element, said piston cylinder unit being movable as a unit during the execution of release movements,
   an opposing brake element which is nonrotatably connectable to a clutch output shaft, wherein said at least one brake element can be pressed against said opposing brake element, and
   means for introducing pressure fluid into said at least one fluid chamber to load said at least one brake element relative to said release slide.

2. A release system as in claim 1 wherein said at least one brake element is pressed against said opposing brake element by introducing pressure fluid into said at least one fluid chamber.

3. A release system as in claim 1 wherein said release slide comprises a plurality of cylindrical chambers arranged in a circle about said rotational axis, said at least one brake element comprising a plurality of pistons slidably received in respective said cylindrical chambers.

4. A release system as in claim 1 wherein said release slide comprises an annular cylindrical chamber concentric to said rotational axis, said at least one brake element comprising a tubular section which is slidably received in said annular cylindrical chamber.

5. A release system as in claim 1 wherein said means for introducing pressure fluid into said at least one fluid chamber comprises a pressure fluid feed connection provided on each said at least one brake element.

6. A release system as in claim 1 wherein pressure fluid can be introduced into said at least one chamber essentially only when said clutch assembly is actuated beyond a point associated with essentially complete release of the clutch.

7. A release system as in claim 6 wherein, during actuation of said clutch assembly up to said point associated with essentially complete release of the clutch, essentially no fluid pressure which could move said brake element relative to said release element is introduced into said chamber.

8. A drive system comprising a clutch assembly and a release assembly, said release assembly comprising a release slide which is connectable to the stored energy element to execute release movements, said release slide having a rotational axis, at least one brake element which, with said release slide, forms a piston cylinder unit having at least one fluid chamber between said release slide and said brake element, said piston cylinder unit being movable as a unit during the execution of release movements, an opposing brake element which is nonrotatably connectable to a clutch output shaft, wherein said at least one brake element can be pressed against said opposing brake element, and means for introducing pressure fluid into said at least one fluid chamber to load said at least one brake element relative to said release slide, said pressure fluid being introduced into said at least one fluid chamber only when said clutch has been actuated beyond a point associated with essentially complete release of the clutch.

9. A drive system as in claim 8 wherein, when said clutch assembly has not been actuated to said point associated with essentially complete release of the clutch, essentially no fluid pressure which could move said brake element relative to said release slide can be introduced into said chamber.

10. A drive system as in claim 9, wherein said at least one fluid chamber is connected to a fluid reservoir.

* * * * *